United States Patent [19]
Haigh

[11] Patent Number: 4,753,413
[45] Date of Patent: Jun. 28, 1988

[54] DIES FOR MAKING GOOSENECK OR "J-TUBE"

[76] Inventor: Brian Haigh, 94 Coleridge Street, Christchurch, New Zealand

[21] Appl. No.: 60,916

[22] Filed: Jun. 12, 1987

Related U.S. Application Data

[63] Continuation of Ser. No. 821,017, Jan. 21, 1986, abandoned.

[30] Foreign Application Priority Data

Jan. 23, 1985 [NZ] New Zealand .................. 210904

[51] Int. Cl.$^4$ .................. B29C 33/00; B29C 33/26
[52] U.S. Cl. .................. 249/64; 249/122
[58] Field of Search .................. 249/63, 64, 122

[56] References Cited
U.S. PATENT DOCUMENTS 2,655,701 10/1953 Hites .................. 249/175
3,632,277 1/1972 Stalter .................. 249/63
3,752,436 8/1973 Deutsch .................. 249/64
3,796,407 3/1974 Brown .................. 249/177

Primary Examiner—Willard Hoag
Attorney, Agent, or Firm—Ross, Ross & Flavin

[57] ABSTRACT

A die, in which is to be formed a hollow article having a part-circular portion, such as a "J-tube", includes two opposed die blocks each formed with die cavities which together form the article, and a part-circular core which is positioned within the cavities to form the part-circular portion of the article. The part-circular core is removed from the article, after one die block has been removed, by rotating the core about an axis through the center of the part circle and raising the core along the axis. The axis is inclined to the surface of the die block, towards that length of the part circular core which emerges first from the part circular cavity.

14 Claims, 1 Drawing Sheet

DIES FOR MAKING GOOSENECK OR "J-TUBE"

This is a continuation of application Ser. No. 06/821,017, filed Jan. 21, 1986, now abandoned.

BACKGROUND OF THE INVENTION

The present invention relates to an improved die for manufacturing tubes of the type commonly known as 'J-tubes' i.e. tubes consisting of a straight-sided portion joined to one limb of a curved generally U-shaped portion, the straight and curved portions lying in the same plane. Up to a few years ago, J-tubes were made of lead or copper, but now most are made of a rigid plastics material such as polypropylene, since plumbing regulations often do not permit the use of J-tubes made of flexible materials. As used herein, the term 'rigid' material means a material which cannot be substantially distorted in shape without damage, although it is sufficiently flexible to allow slight (e.g. a few millimetres) distortion without damage. However, such material is normally flexible when heated, as during a moulding process, for example a thermoplastic.

Most plastics J-tubes are made by injection moulding the plastics material into a suitably shaped die, the lumen of the tube being occupied by a core positioned in the die. Clearly, it is advantageous to make the J-tube in one piece if possible, but since the J-tube must be made of a rigid material, it is difficult to extract the cor from the curved portion of the 'J' tube because the core emerging from the curved portion strikes the straight portion of the tube.

This problem has been overcome in a number of ways:—by using a multi-part core for the curved portion, or by using conventional die and a two-part core, one part for the straight portion of the tube and one part for the curved portion, and removing the curved part of the core by distorting the tube to force the curved part of the core past the straight portion of the tube. Considerable force is needed to extract this curved core part and the tube and cores together must be removed from the die before the curved core part is extracted. The extraction is done manually or part-manually, which of course slows down the whole forming operation. The use of a multi-part core for the curved, portion of the tube reduces the distortion needed to extract the core, but again slows the forming operation because the core must be re-assembled after each tube is formed.

SUMMARY OF THE INVENTION

An object of the present invention is the provision of a J-tube die which enables J-tubes to be formed by a completely automatic operation, the J-tubes being made of a rigid material e.g. a suitable plastics or an aluminium alloy. The die of the present invention has been developed particularly for the manufacture of plastics J-tubes and will be described with special reference to this application, but it will be appreciated that the die of the present invention could be easily adapted to the manufacture of metal J-tubes, using a diecasting process.

In accordance with the present invention there is provided: a die for forming a curved tubular article. It comprises a pair of opposed die blocks. The opposed die blocks define generally corresponding die cavities. The confronting die surfaces define portions of the cavities having centers of curvature defining a curved center line; and supporting means for supporting a curved core for forming the lumen of said portion, such that when one of said die blocks is removed to expose the die cavity of the remaining die block, said supporting means is able to revolve said core out of the die cavity of the remaining die block, around an axis of revolution which passes through a point which is the center of said part circle, and to reciprocate said core along said axis of revolution; wherein said axis of revolution is inclined relative to that surface of said remaining die block which contains the die cavity towards a part of said core which will be removed first from said die cavity by said revolving.

BRIEF DESCRIPTION OF THE DRAWINGS

By way of example, a preferred embodiment of the present invention is described in detail with reference to the accompanying drawings, in which.

DETAILED DESCRIPTION OF THE PREFERRED EMBODIMENT

Figures 1, 2:
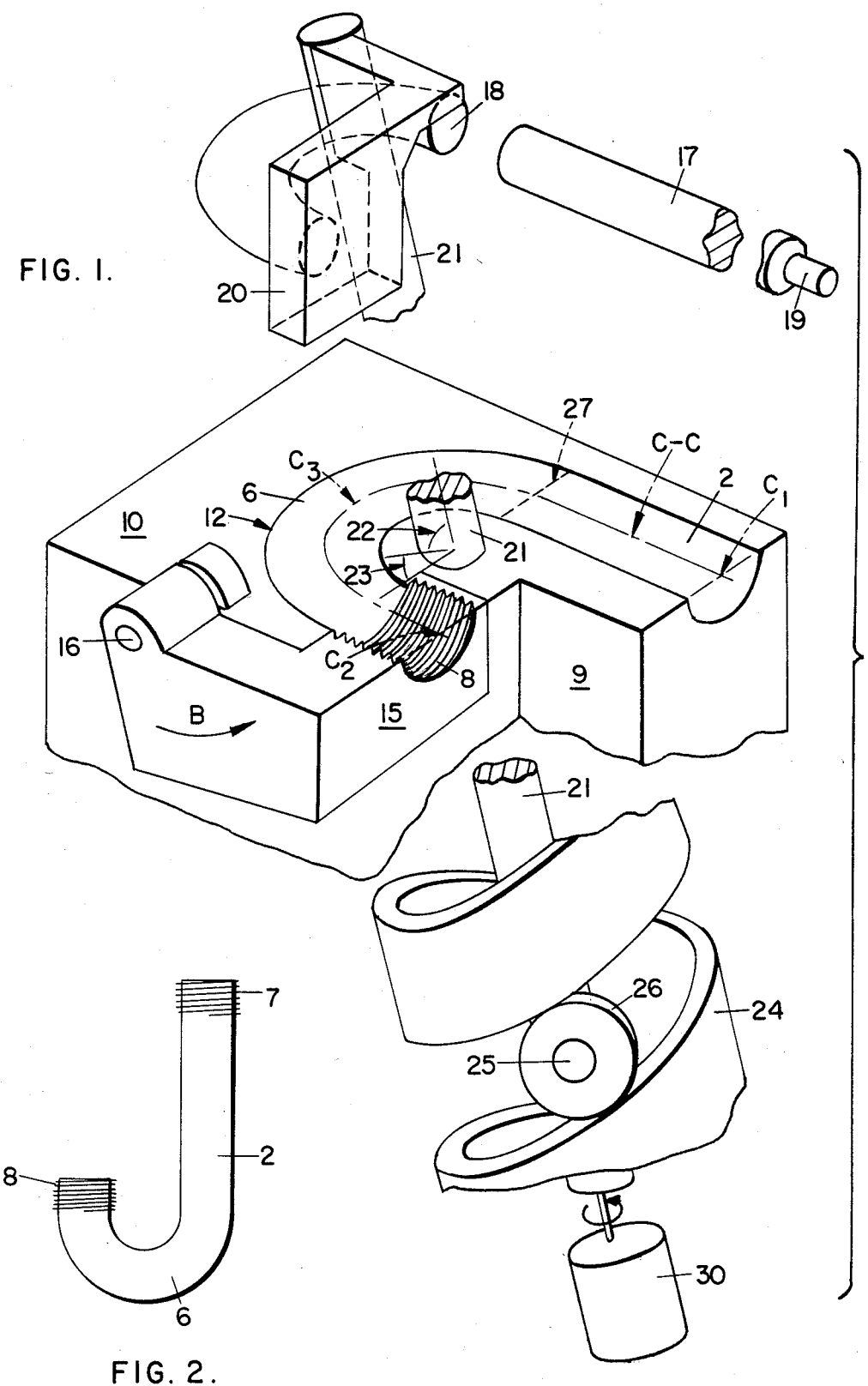
FIG. 1 shows an exploded perspective view of part of a die in accordance with the present invention.
FIG. 2 shows a J-tube.

Referring to the drawings, a die for injection-moulding a polypropylene J-tube comprises two steel blocks with half of the die cavity formed in each of the opposing faces of the blocks. For clarity, only one block 9 is shown in the drawings, the other block being the mirror-image of that shown. As shown in FIG. 2 a J-tube comprises a straight portion 2 joined to a curved, generally semi-circular portion 6. The free ends are formed with external screw threads 7, 8. In the die block 9, the portions of the cavity are numbered to correspond to the portions of the J-tube.

Referring to FIG. 1, the die block 9 shown provides a first surface 10 in which the die cavity 12 is cut. The surface 10 of die block 9 and the confronting surface of the other mirror image die block, not shown, define portions of the cavities having centers of curvature defining a curved center line ccl shown in a dotted line in FIG. 1. The part of the die block 9 which provides the die cavity for the screw-threaded end 8 of the curved portion 6 is formed as a separate block 15 being part of a lever pivoted to the main block by a pivot 16, for reasons discussed later. However, in the other die block (not shown) the die cavity for said end 8 is formed integrally with the rest of the die block.

The die blocks define a "J" shaped mold cavity with a long, generally straight, leg and a short leg with a curved mold cavity portion therebetween. Each leg has a central axis which joins with a central line through the curved mold portion, as shown in FIG. 1 by the line c—c. If plural sections were taken through the mold cavity to line c—c, they would intersect line c—c at various points such as $c_1$, $c_2$ and $c_3$. The connected points may be said to define the center of curvature of the mold cavity. Line c—c also is curved and itself has a center of curvature which corresponds generally to the center of rod 21.

In use, the cores 17, 18 occupying the lumen of the straight portion 2 of the tube and the lumen of the curved portion 6 of the tube are positioned in the corresponding parts of the die cavity so that they butt against each other along the broken line 27 and the two die blocks are clamped together. Each of said cores is supported from the free end of the corresponding cavity, as described hereinafter. A suitable plastics material (e.g. polypropylene) is then injected into the die cavity in the usual way, and when the material has hardened sufficiently, the two die blocks are unclamped and said other die block (i.e. the block not shown in the drawings) is swung away. The core 17 is mounted on a supporting rod 19 which can be moved to withdraw that core from the lumen of the straight portion 2 of the tube. It is necessary to withdraw the curved cor 18 from the lumen of the curved portion 6 of the tube. If this core were withdrawn by moving the core in the plane of the die cavity, then the leading end of the core would strike the straight portion 2 of the tube before the core was completely withdrawn. It is therefore necessary to raise the core 18 sufficiently to avoid said straight portion, but the distance raised must be minimized to minimize the distortion of the tube.

The curved core 18 is rigidly fastened by means of an L-shaped block 20 to a rod 21, which is rotatable in and slidable through a bore in the die block 9. The rod 21 is inclined at an angle 22 to the face 10 of the die block 9. The angle 22 is located at an angle 23 to a line through the ends of the semi-circular core 18.

Beneath the block 9 a helical cam 24 is affixed to unshown stationary structure, coaxial with the rod 21. A stub axle 25 extending radially from the rod 21 has pivoted thereon a roller 26 operative on the cam 24. Thus rotation of the rod 21 and core 18, from its working position, causes the roller 26 to ride up the cam 24 and extend the rod 21 upwardly through the face 10 of the block 9.

It will be seen that, without the use of the cam 24, as the core 18 is rotated out of the curved portion 6, the trailing end which has been abutting the end of the straight core 17, would take a falling path into the metal of the block 9 to a lowest point in the plane in which the angle 22 is measured. The form of the cam 24 is chosen to raise the trailing edge of the core 18 just sufficiently to compensate for the fall due to the inclination of the rod 21. Thus, from the line 27 through about 90 degrees of rotation of the rod 21, the centre of the trailing edge moves in or close to the plane of the face 10.

If necessary to achieve this objective, the cam 24 may deviate from the constant helix-angle shown.

As the core 18 is revolved from its working position, the leading end, which is fastened to the block 20, rises above the face 10 for two reasons. Firstly, due to its rotation about the axis of the rod 21 away from the plane in which the angle 22 is measured, and secondly due to the superimposed rise of the rod 21 due to the cam 24.

By appropriate selection of the angles 22, 23 and related adjustment of the helix angle of the cam 24, it is possible for the leading end of the core 18 to pass abov the formed tube lying in the straight die cavity 2, at least until the trailing end of the core 18 comes clear of the tube.

As the rod 21 starts to lift the curved core 18, the block 15 starts to pivot in the direction of arrow B (FIG. 1). This serves two purposes: it prevents the thread from being stripped or damaged on the screw-threaded portion 8 of the tube when the tube distorts during the last stage of core removal, and it helps to jam the tube in the die cavity so that although the tube may have cooled and shrunk onto the core the tube is held securely in the die cavity to allow the core to be extracted.

The rod 21 is rotated by an electric or hydraulic motor 30 and a control operates an unshown actuator to withdraw the core 17 at a predetermined angle of rotation of the rod 21.

When both straight and curved cores have been removed, the tube is freed from the die cavity and the core and die blocks can be positioned to start another cycle The J-tube produced by this method has a normal uniform wall-thickness and is of standard shape, since the small distortions required during the last stage of the curved core removal do not permanently deform the tube Clearly, the values of the angles 22,23 and the helix angle of the cam 24 will depend on the relationship of the outside diameter of straight portion 2 of the J-tube to the radius of the centre line of the curved portion 6 and taking account of the thickness of the material of the J-tube. The bigger the J-tube for a fixed cross section the smaller will be the helix angle of the cam 24 and the angle 22 can be greater. Such parameters must be calculated or worked out by simple trial and error for each set of dimensions of the J-tube. We have found that where the outside diameter of the J-tube cross section is 0.76 times the radius of the centre line of the curved portion, the angles 22 and 23 are satisfactory at around 77.6 degrees and 34.6 degrees respectively. The extent to which deviation from these angles is satisfactory depends on the material being moulded and wall thickness thereof.

In some designs of J-tube one or both free ends may be formed with external flanges or other protrusions, in place of the threads 7, 8 in which case the block 15 is formed with a correspondingly shaped groove, but the action of the pivoting block 15 is the same as with the thread.

What I claim is:

1. A die for forming a curved, tubular article, comprising: a pair of opposed die blocks defining generally corresponding die cavities, die surfaces defining portions of said cavities having centers of curvature defining a curved center line and having a center of curvature, supporting means for supporting a curved core for forming the lumen in the molded said article having a longitudinal axis of revolution which passes approximately through the center of curvature of said center line, means for rotating said supporting means about said axis of revolution and said core out of the curved portion of the die cavity when one of said die blocks is removed to expose the die cavity of the remaining die block, and means for reciprocating said supporting means axially along said axis of revolution, said axis being inclined relative to a surface of the remaining die block which contains the die cavity towards a part of said core which will be removed first from said die cavity by said revolving.

2. A die, according to claim 1, in which, during the first part of the curved core revolution, said reciprocation of the supporting means along said axis of revolution is adquate to move that part of said core which will be the last to be removed from said die cavity at a substantially constant distance from the adjacent walls of said die cavity.

3. A die, according to claim 1, wherein said die cavities are configured to form a hollow article of substantially constant cross-section comprising a straight portion and an adjoining substantially semi-circular portion, said axis of revolution passing through the approximate center of the semi-circular portion, in which the magnitude and direction of the inclination of the axis of revolution relative to said remaining die block surface, combined with the axial reciprocation of the core support means is adequate for said core to pass over the straight portion of the article as said core is revolved until said core has been completely removed.

4. A die, according to claim 3, wherein said semi-circular portion of said die cavity has two quadrants and in which the axis of revolution is inclined towards the quadrant furthest from the straight portion of said die cavity.

5. A die, according to claim 1, in which the height of said die cavity cross-section normal to the remaining die block surface is approximately 0.76 times the radium of the center line of the semi-circular portion, and in which the minimum angle of inclination between said axis of revolution and the remaining die block surface is approximately 77.6 degrees.

6. A die, according to claim 1, in which a plane normal to the remaining die block surface and containing the axis of revolution intersects the remaining die block surface along a line which is approximately 34.6 degrees from a further line on the remaining die block surface through the ends of the semi-circular portion of the die cavity.

7. A die, according to claim 1, in which the reciprocating movement means comprises a cam means.

8. A die, according to claim 7, in which the cam means comprises a ramp of helical formation co-axial with the axis revolution.

9. A die, according to claim 8, in which the helix angle of the ramp is constant.

10. A die, according to claim 3 including a control means to withdraw a core from the straight portion after a predetermined amount of the revolution of the supporting means.

11. A die, according to claim 1 including a depression formed in the said remaining die block, to form an external protrusion at one end of said curved portion of the article, the depression being in a face of a lever pivoted to said die bock, said face being in the plane of the surface of said die block in a first working position and being raisable to a second position above said surface by pivoting of the lever.

12. A die according to claim 11, in which the protrusion is a thread formation.

13. A die according to claim 11, in which the protrusion is a flange formation.

14. A die comprising a pair of opposed die blocks each providing mutually registrable die cavities capable of forming a hollow article which includes a portion of which the center line is a part circle at an end thereof; and means for supporting a core intended to form the lumen of said part-circular portion, said supporting means being able to revolve the core out of the die cavity around an axis through the center of the part circle and to reciprocate the core along the axis of revolution; wherein, the axis is inclined, relative to the surface of one die block containing the die cavity, towards the length of part-circular core which will first emerge from the cavity.

* * * * *